(12) United States Patent
Kim

(10) Patent No.: US 7,455,610 B2
(45) Date of Patent: Nov. 25, 2008

(54) POWER TRANSMITTING APPARATUS

(75) Inventor: Wan Soo Kim, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 303 days.

(21) Appl. No.: 11/543,737

(22) Filed: Oct. 5, 2006

(65) Prior Publication Data

US 2007/0254761 A1 Nov. 1, 2007

(30) Foreign Application Priority Data

Apr. 26, 2006 (KR) .................. 10-2006-0037541

(51) Int. Cl.
 *F16H 3/72* (2006.01)
(52) U.S. Cl. ......................................... 475/5
(58) Field of Classification Search ............. 475/5; 903/910, 911
 See application file for complete search history.

(56) References Cited

U.S. PATENT DOCUMENTS

| 6,558,283 | B1 * | 5/2003 | Schnelle ................. 475/5 |
| 6,811,508 | B2 * | 11/2004 | Tumback ................ 475/5 |
| 7,128,677 | B2 * | 10/2006 | Supina et al. ............ 475/5 |
| 7,166,050 | B2 * | 1/2007 | Schmidt et al. .......... 475/5 |
| 7,314,421 | B2 * | 1/2008 | Kim ...................... 475/5 |
| 2004/0251862 | A1 * | 12/2004 | Imai ...................... 318/376 |
| 2007/0129196 | A1 * | 6/2007 | Bucknor et al. .......... 475/5 |

FOREIGN PATENT DOCUMENTS

JP 2000-094973 4/2000

* cited by examiner

*Primary Examiner*—Thu Nguyen
*Assistant Examiner*—Erin D Bishop
(74) *Attorney, Agent, or Firm*—Morgan, Lewis & Bockius LLP

(57) ABSTRACT

The present invention relates to a power transmission for a hybrid vehicle with a more compact and lightweight design. The power transmission of the invention includes: an engine; a first shaft; a first planetary gear set disposed on the first shaft; a first motor/generator unit connected to the first planetary gear set; a second shaft disposed in parallel with the first shaft, the second shaft having a mediate gear; a second planetary gear set disposed on the second shaft; a second motor/generator unit connected to the second shaft; and a differential unit having a final gear connected to the mediate gear of the second shaft. In this manner, power is transmitted through the power transmission system by virtue of the external intermeshing of the first and second ring gears.

13 Claims, 1 Drawing Sheet

POWER TRANSMITTING APPARATUS

CROSS-REFERENCE TO RELATED APPLICATION

This application claims priority to and the benefit of Korean Patent Application No. 10-2006-0037541, filed in the Korean Intellectual Property Office on Apr. 26, 2006, which is incorporated herein by reference in its entirety for all purposes.

FIELD OF THE INVENTION

The present invention relates to power transmissions for vehicles and more particularly to improved power transmissions with compact and lightweight construction for use in hybrid vehicles.

BACKGROUND OF THE INVENTION

A hybrid vehicle is a vehicle that operates on multiple sources of energy. Of the various types of hybrid vehicles, fuel-electric hybrid vehicles are equipped with an engine that generates power through fuel combustion and a rechargeable energy storage system, e.g. a battery, that feeds power to a motor. Hybrid vehicles typically operate at reduced noise levels, have more efficient fuel consumption, and have lower emissions than conventional vehicles. Accordingly, increasing effort is being dedicated to the development of hybrid vehicles.

In conventional power transmissions for hybrid vehicles, an engine, a generator, and a first planetary gear set are connected to a first shaft and a motor, a second planetary gear set, and a differential unit are connected to a second shaft. The first planetary gear set and the second planetary gear set are connected via a power transmission unit having a plurality of gears. In this manner, power is routed from the engine through the first shaft to the first planetary gear set, then from the first planetary gear set to the gears of the power transmission unit and onto the second planetary gear set. From the second planetary gear set, power then flows through the second shaft to the differential unit, which in turn drives the wheels. The power transmission unit is therefore a necessary component in transferring power from the engine to the wheels in conventional power transmission systems.

Due to the complex gear engagement mechanisms, the conventional power transmission unit is heavy and bulky, thereby detracting from the fuel efficiency that a hybrid vehicle may achieve. In addition, installation and removal of the generator and motor are difficult because of the complex engagements of the plurality of gears.

The above information is provided only to enhance understanding of the background of the invention and not to be construed as a representation of prior art with respect to the present invention.

SUMMARY OF THE INVENTION

The present invention provides a more compact and lightweight power transmission system that is useful for hybrid vehicles. The power transmission system is designed so as to obviate the need for a conventional power transmission unit and enable the first planetary gear set to directly engage the second planetary gear set.

An power transmission for a hybrid vehicle according to an exemplary embodiment of the present invention can include: an engine; a first shaft connected to the engine; a first planetary gear set; a first motor/generator unit; a second shaft; a second planetary gear set; a second motor/generator unit; and a differential unit. The first planetary gear set, which includes a first ring gear, a first pinion gear, a first sun gear, and a first carrier, is disposed on the first shaft. The first motor/generator unit is connected to the first planetary gear set. The second shaft, having a mediate gear, is disposed substantially parallel to the first shaft. The second planetary gear set, which includes a second ring gear, a second pinion gear, a second sun gear, and a second carrier, is disposed on the second shaft and is externally gear meshed with the first planetary gear set; i.e. the teeth of the outer edge of the second planetary gear set and the teeth of the outer edge of the first planetary gear set are directly engaged with each other. The first and second planetary gear sets are arranged such that the external gear teeth of the first ring gear are in meshed engagement with the external gear teeth of the second ring gear. The second motor/generator unit is connected to the second shaft and the differential unit includes a final gear that is connected to the mediate gear of the second shaft.

In preferred embodiments, the first carrier is coaxially connected to the first shaft whereas the first sun gear is coaxially connected to the first motor/generator unit. The second carrier is coaxially connected to the second shaft, the second ring gear coaxially connected to the second motor/generator unit, and the second sun gear fixedly connected to a transmission case. The first and second ring gears in the first and second planetary gear sets, respectively, can be supported by bearings. In the power transmission of the present invention, the parking gear is operably connected to the second carrier. The parking gear can be disposed between the second planetary gear set and the mediate gear of the second shaft. The parking gear and the final gear can be disposed in substantially vertical alignment with the first motor/generator unit. The first motor/generator unit is in turn disposed between the engine and the first planetary gear set. The second motor/generator unit can be disposed distal from the engine and the mediate gear of the second shaft disposed proximal to the engine, relative to the second planetary gear set. In some embodiments of the invention, one of the first and second motor/generator units is used as a motor while the other is used as a generator. For example, the first motor/generator unit can be used as a generator that generates power by regenerative braking when the second motor/generator unit is be used as a motor.

Each of the first and second shafts can be operably connected to a hydraulic pump, which supplies oil to the first and second planetary gear sets through openings that permit the flow of oil from one end to the other of the first and second shafts, respectively.

DETAILED DESCRIPTION OF THE INVENTION

Figure 1:
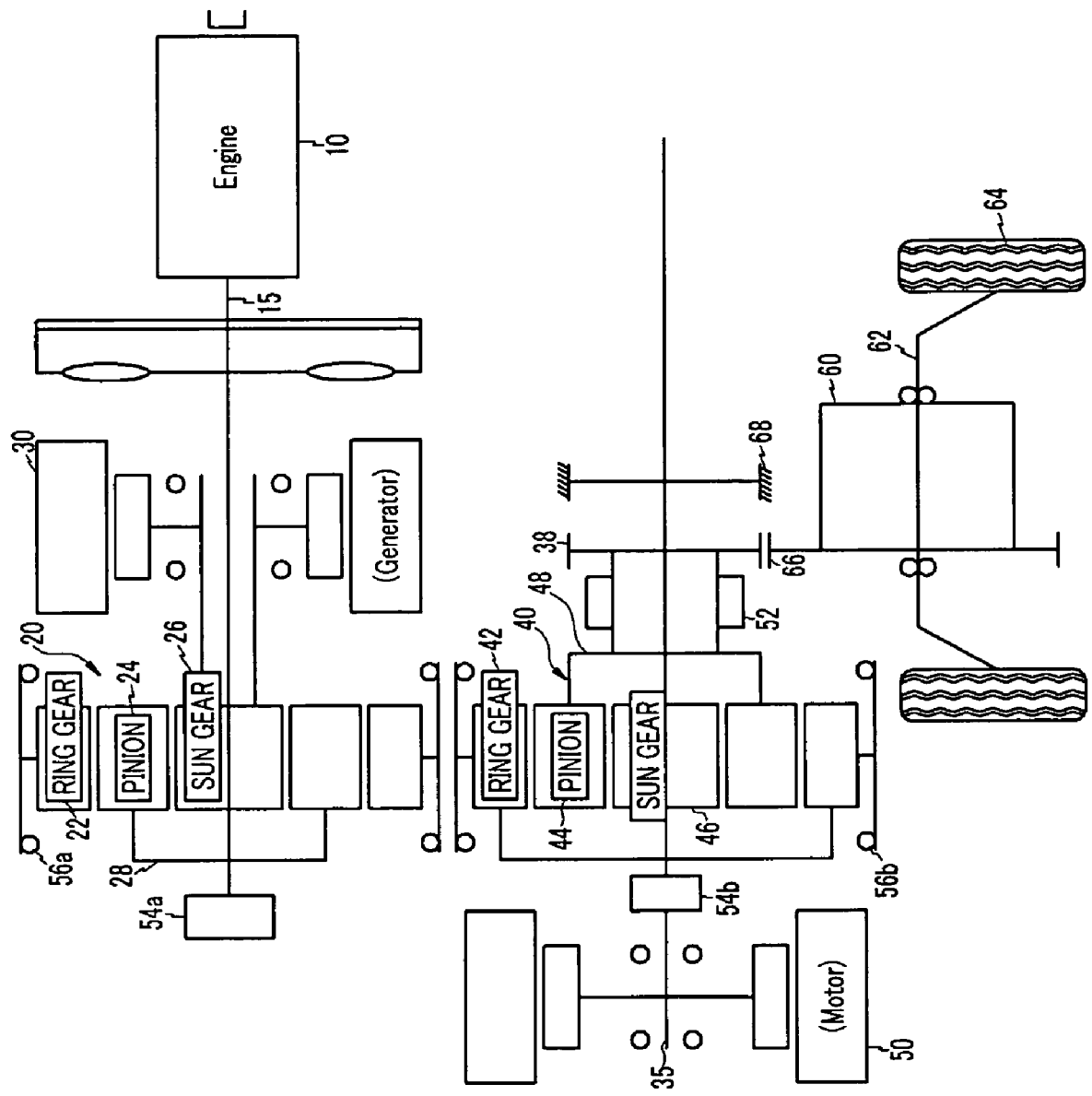
FIG. 1 is a schematic diagram of a power transmission useful in a hybrid vehicle according to an exemplary embodiment of the present invention. An exemplary embodiment of the present invention will hereinafter be described in detail, with respect to the accompanying drawings.

As shown in FIG. 1, the power transmission according to an exemplary embodiment of the present invention includes an engine 10, a first planetary gear set 20, a second planetary gear set 40, a first motor/generator unit 30, a second motor/generator unit 50, and a differential unit 60. In addition, the engine 10, the first planetary gear set 20, and the first motor/ generator unit 30 are disposed on a first shaft 15. The second planetary gear set 40 and the second motor/generator unit 50 are disposed coaxially on a second shaft 35. The differential unit 60 is connected to wheels 64 through a third shaft 62 so as to supply power to the wheels 64.

The engine 10 generates power through fuel combustion. Engines that can be used with the power transmission system of the present invention include gasoline engines, diesel engines, LPG engines, methanol engines, and hydrogen engines.

The first shaft 15 connects the engine 10 with a first carrier 28 of the first planetary gear set 20 so that the power of the engine 10 is transmitted to the first planetary gear set 20. The first shaft 15 is open at both ends to permit the flow of transmission oil therein.

The first planetary gear set 20 is a single-pinion planetary gear set including a first sun gear 26, a first ring gear 22, a first pinion gear 24, and a first carrier 28 rotatably supporting the first pinion gear 24. The first carrier 28 is coaxially and rotatably connected to the first shaft 15, and the first sun gear 26 is coaxially and rotatably connected to the first motor/generator unit 30. Gear teeth are formed on the exterior circumference of the first ring gear 22 to engage with the external gear teeth of a second ring gear 42 of the second planetary gear set 40. In this manner, the first planetary gear set 20 transmits the power of the engine 10 to the second planetary gear set 40, and rotates the first motor/generator unit 30 so as to recharge a battery (not shown). In this illustration, the first motor/generator unit 30 functions as a conventional generator.

Alternatively, the first planetary gear set 20 can transmit power generated at the first motor/generator unit 30 to the second planetary gear set 40. In this illustration, the first motor/generator unit 30 functions as a conventional motor.

The first motor/generator unit 30 includes a stator (not shown) and a rotor (not shown). The first motor/generator unit 30 is coaxially and rotatably connected to the first sun gear 26. The first motor/generator unit 30 can be connected to the battery (not shown) so that the first motor/generator unit 30 supplies a driving torque to the wheels 64 from the battery or recharges the battery by regenerative braking. In the context of the power transmission system, the first motor/generator unit 30 can be disposed between the engine 10 and the first planetary gear set 20.

The second planetary gear set 40 is a single-pinion planetary gear set including a second sun gear 46, a second ring gear 42, a second pinion gear 44, and a second carrier 48 rotatably supporting the second pinion gear 44. The second carrier 48 is coaxially and rotatably connected to the second shaft 35. Gear teeth are formed on the exterior circumference of the second ring gear 42 so as to engage with the gear teeth on the exterior of the first ring gear 22 to obviate any need for the conventional power transmission unit. The second sun gear 46 is fixedly connected to a transmission case 68. In addition, the second ring gear 42 is coaxially and rotatably connected to the second motor/generator unit 50. The parking gear 52 is connected to the second carrier 48.

In this manner, the second planetary gear set 40 transmits the power from the first planetary gear set 20 to the second planetary gear set 40 onto the second shaft 35, and rotates the second motor/generator unit 50 so as to recharge the battery.

Meanwhile, the first ring gear 22 and the second ring gear 42 are supported by bearings 56a and 56b. The second shaft 35 is disposed in parallel with the first shaft 15, and is coaxially and rotatably connected to the second carrier 48. In addition, the second shaft 35 includes a mediate gear 38 that is engaged with a final gear 66 of the differential unit 60. The second shaft 35 is open at both ends to permit the flow of transmission oil therein.

The second motor/generator unit 50 includes a stator (not shown) and a rotor (not shown). The second motor/generator unit 50 is coaxially and rotatably connected to the second ring gear 42. In exemplary embodiments of the invention, the second motor/generator unit 50 is connected to the battery (not shown) so that the second motor/generator unit 50 supplies the driving torque to the wheels 64 from the battery or recharges the battery by regenerative braking.

Meanwhile, the second motor/generator unit 50 is disposed distal from the engine 10 and the mediate gear 38 of the second shaft 35 is disposed proximal to the engine 10, relative to the second planetary gear set 40. This arrangement accommodates both the first motor/generator unit 30 and the second motor/generator unit 50 without crowding or overlap and provides a smaller power transmission than that of the prior art.

Further, an effective arrangement of the first and second motor/generator units 30 and 50 is possible by disposing the parking gear 52 between the second planetary gear set 20 and the mediate gear 38 of the second shaft 35, further reducing the size of the transmission.

The differential unit 60 includes the final gear 66, which engages with the mediate gear 38 of the second shaft 35. As illustrated in FIG. 1, differential unit 60 is disposed rotatably on a third shaft 62. The wheels 64 are likewise disposed on the third shaft 62. In exemplary embodiments of the invention, the wheels are disposed on both ends of third shaft 62. The differential unit 60 thereby transmits power from the second shaft 35 to the wheels 64.

The final gear 66 and the parking gear 52 are disposed in substantially vertical alignment with the first motor/generator unit 30, thereby reducing the bulkiness of the power transmission of the invention. Hydraulic pumps 54a and 54b can also be connected to the first shaft 15 connected to the first carrier 28 and the second shaft 35 connected to the second ring gear 42, respectively, to supply oil to the friction surfaces of the first and second planetary gear sets 20 and 40.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A power transmission for a hybrid vehicle, comprising:
   an engine;
   a first shaft connected to the engine;
   a first planetary gear set disposed on the first shaft, said first gear set comprising a first ring gear, a first pinion gear, a first sun gear, and a first carrier;
   a first motor/generator unit connected to the first planetary gear set;
   a second shaft disposed in parallel with the first shaft, the second shaft having a mediate gear;
   a second planetary gear set having a second ring gear, a second pinion gear, a second sun gear, and a second carrier, the second gear set being disposed on the second shaft and externally gear-meshed with the first planetary gear set;
   a second motor/generator unit connected to the second shaft; and a differential unit having a final gear connected to the mediate gear of the second shaft, wherein the first and second ring gears are disposed so as to directly engage one another.

2. The power transmission of claim 1, wherein the first carrier is coaxially connected to the first shaft and the first sun gear is coaxially connected to the first motor/generator unit.

3. The power transmission of claim 2, wherein the second carrier is coaxially connected to the second shaft, the second ring gear is coaxially connected to the second motor/generator unit, and the second sun gear is fixedly connected to a transmission case.

4. The power transmission of claim 2, wherein the first and second ring gears are supported by bearings.

5. The power transmission of claim 3, wherein a parking gear is connected to the second carrier.

6. The power transmission of claim 5, wherein the first motor/generator unit is disposed between the engine and the first planetary gear set.

7. The power transmission of claim 5, wherein the second motor/generator unit is disposed distal from the engine and the mediate gear of the second shaft is disposed proximal to the engine, relative to the second planetary gear set.

8. The power transmission of claim 7, wherein the parking gear is disposed between the second planetary gear set and the mediate gear of the second shaft.

9. The power transmission of claim 8, wherein the parking gear and the final gear are disposed in substantially vertical alignment with the first motor/generator unit.

10. The power transmission of claim 3, wherein each of the first and second shafts are connected to a hydraulic pump.

11. The power transmission of claim 10, wherein the hydraulic pumps supplies oil to the first and second planetary gear sets, respectively, through the interior of the first and second shafts.

12. The power transmission of claim 3, wherein one of the first and second motor/generator units is used as a motor and the other is used as a generator.

13. The power transmission of claim 12, wherein the first motor/generator unit is used as a generator that generates power by regenerative braking, and the second motor/generator unit is used as a motor.

* * * * *